US008533466B2

(12) United States Patent
Taylor

(10) Patent No.: US 8,533,466 B2
(45) Date of Patent: *Sep. 10, 2013

(54) ELECTRONIC FILE ACCESS CONTROL SYSTEM AND METHOD

(75) Inventor: Jeffrey Edward Taylor, Chatsworth, CA (US)

(73) Assignee: NBCUniversal Media, LLC, New York, NY (US)

(*) Notice: Subject to any disclaimer, the term of this patent is extended or adjusted under 35 U.S.C. 154(b) by 1288 days.

This patent is subject to a terminal disclaimer.

(21) Appl. No.: 12/343,278

(22) Filed: Dec. 23, 2008

(65) Prior Publication Data

US 2010/0161977 A1  Jun. 24, 2010

(51) Int. Cl.
*H04L 29/06* (2006.01)

(52) U.S. Cl.
USPC .................. 713/165; 713/189; 380/281

(58) Field of Classification Search
USPC .................. 713/165, 189; 380/281
See application file for complete search history.

(56) References Cited

U.S. PATENT DOCUMENTS

| | | | |
|---|---|---|---|
| 6,212,634 B1* | 4/2001 | Geer et al. ............... | 713/156 |
| 6,226,744 B1* | 5/2001 | Murphy et al. .............. | 726/5 |
| 6,378,070 B1* | 4/2002 | Chan et al. ............... | 713/155 |
| 6,542,261 B1* | 4/2003 | McGraw .................. | 358/434 |
| 6,831,982 B1* | 12/2004 | Hughes et al. ............. | 380/281 |
| 7,472,280 B2* | 12/2008 | Giobbi ..................... | 713/182 |
| 8,166,530 B2* | 4/2012 | Adams et al. ................ | 726/9 |
| 2002/0023143 A1* | 2/2002 | Stephenson et al. ......... | 709/218 |
| 2002/0044655 A1* | 4/2002 | Applebaum ............... | 380/45 |
| 2002/0154775 A1* | 10/2002 | Yang ....................... | 380/236 |
| 2003/0023882 A1* | 1/2003 | Udom ...................... | 713/202 |
| 2003/0220096 A1* | 11/2003 | Smeets .................... | 455/410 |
| 2005/0156029 A1* | 7/2005 | Hopkins ................... | 235/382 |
| 2005/0210259 A1* | 9/2005 | Richardson ............... | 713/179 |
| 2006/0253703 A1* | 11/2006 | Eronen et al. ............. | 713/156 |

* cited by examiner

*Primary Examiner* — April Y Blair
(74) *Attorney, Agent, or Firm* — Fletcher Yoder, PC

(57) ABSTRACT

A digital file is associated with a header in which identification data for a physical key is stored. The digital file content is encrypted, and may not be decrypted by a receiving computer unless a removable physical key that can be associated with the receiving computer includes identification data which matches the identification data stored in the file header. The digital content encrypted in the file may be compressed, and the header may also be encrypted. When the header is encrypted, the receiving computer may decrypt only the header unless the identification data of the header matches the identification data for a removable physical key. Improved security and reduction of pirating of the digital content are therefore provided.

18 Claims, 3 Drawing Sheets

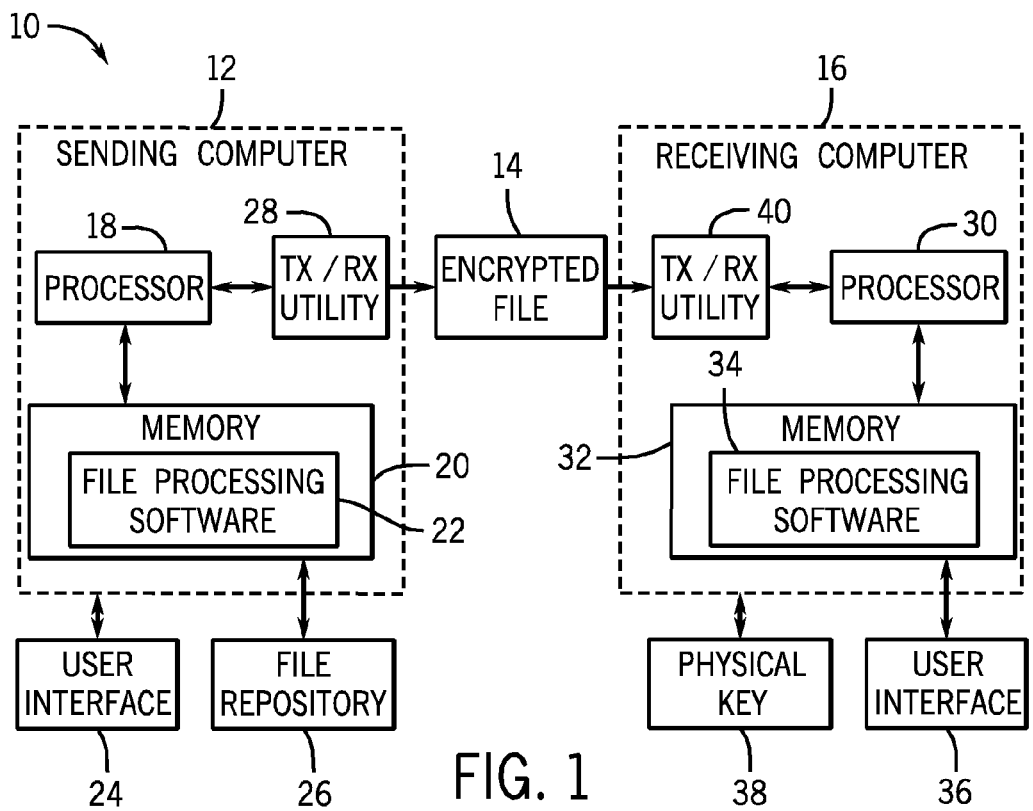
FIG. 1
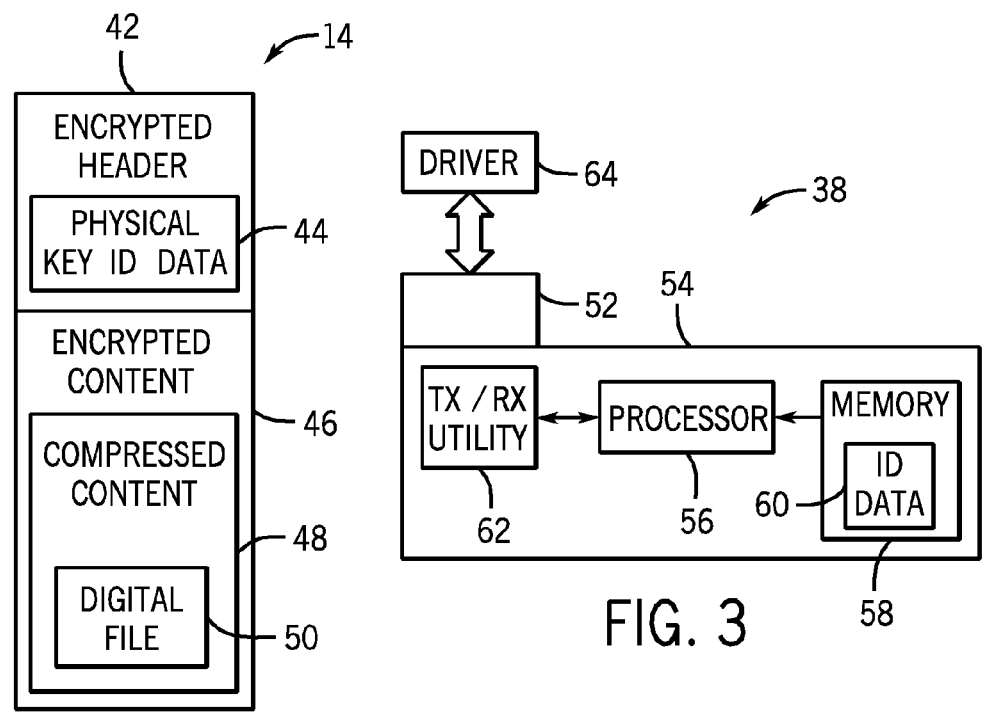
FIG. 2
FIG. 3

ELECTRONIC FILE ACCESS CONTROL SYSTEM AND METHOD

BACKGROUND OF THE INVENTION

The present invention relates generally to the secure transmission of digital files and data. More particularly, the invention relates to a novel technique for transmitting files to designated recipients in a secure manner, permitting only those designated recipients to view, play, or otherwise use and manipulate the files.

Many settings require that electronic files be transmitted in a secure manner. For example, text documents, images, audio, video and multi-media files are commonly transmitted between computers, or between servers via the Internet. The transmission may be intercepted or otherwise diverted or replicated, possibly leading to a compromise of security. A number of techniques have been developed to address such concerns. For example, various cryptographic techniques have been developed in which data is altered such that it can be reconstituted for use only with knowledge of proper key information. Many cryptographic techniques employ private and public "keys", which are typically strings of characters that can be input or referred to when accessing the encrypted data.

While such techniques are effective in certain circumstances, the actual security is again subject to the relative strength or weakness of the cryptographic keys. That is, any person who can access or copy the necessary key data can, in principle, also access the content of the secure file.

Physical keys have also been developed that allow for some degree of control over access to computers and secure files. Such physical keys may be associated with a reading computer and bear a unique identification. However, such keys are not currently adapted to limit access to secure data files, nor are data files adapted to limit access based upon such physical keys.

Certain areas of technology are particularly demanding in this regard. For example, in multi-media production, large files are often exchanged between various parties, such as for post-production mixing, refinement, processing, and so forth. This is typically performed through the use of proxy video files, which may be somewhat substandard copies, produced in lower resolution or compressed, which may incorporate watermarks or other devices to limit their attractiveness to those who might consider pilfering such files. However, if such files are pilfered or otherwise pirated, they may be disseminated widely and easily, such as by posting on the Internet. Such activities pose hazards to security, and may greatly reduce the commercial value of the production represented by the digital file.

There is, at present, a great need for improved techniques for secure transmission and use of digital files. In particular, there is a need for a technique that will allow a provider of a digital file to quickly and easily create a file format or message that can be transmitted to or accessed by one or more designated recipients and that can ensure that only those recipients can access and manipulate the underlying digital file.

BRIEF DESCRIPTION OF THE INVENTION

The present invention provides a novel technique designed to respond to such needs. The technique may be used with any type of digital file, and is particularly well-suited to sensitive files that must be exchanged between a provider and one or more designated recipients. The files may include, for example, text files, image files, multi-media files, proxy video files, pre-production and post-production working files, and so forth.

In accordance with certain aspects of the invention, a method is provided method for controlling access to a digital file. In accordance with the method, on a reading computer, an encrypted file is accessed. The file includes a header and encrypted digital content, the header including data identifying a permitted access identity corresponding to a physical key removable from the reading computer. The permitted access identity in the header is compared to identity data of a physical key removably coupled to the reading computer. The encrypted digital content is decrypted only if the identity data of the physical key matches the permitted access identity of the header. The header may be encrypted, and in such case, the header can be decrypted without decryption of the digital content for the purpose of comparing the permitted access identity encoded in the header to the physical key identity data.

The invention also provides a method in which digital content is associated with a header, the header including data identifying a permitted access identity corresponding to a physical key removable from a reading computer. The header and the digital content are encrypted, with the header being susceptible to decryption separate from the content by a key interface.

Moreover, the invention provides a system for controlling access to a digital file, where that digital file includes an encrypted file including a header and encrypted digital content, the header including data identifying a permitted access identity corresponding to a physical key removable from a reading computer. A key interface is configured to decrypt the encrypted header, to compare the permitted access identity to identity data of a physical key removably coupled to a reading computer, and to decrypt the encrypted content only if the identity data of the physical key matches the permitted access identity of the header.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 1 is a diagrammatical overview of a system for transmitting a digital file in a secure manner between a sending computer and a receiving computer;

FIG. 2 is a diagrammatical representation of a typical file constructed in accordance with aspects of the present invention;

FIG. 3 is a diagrammatical representation of a physical key that may be used for the secure transmission and access to the file illustrated in FIG. 2;

DETAILED DESCRIPTION OF THE INVENTION

Figure 4:
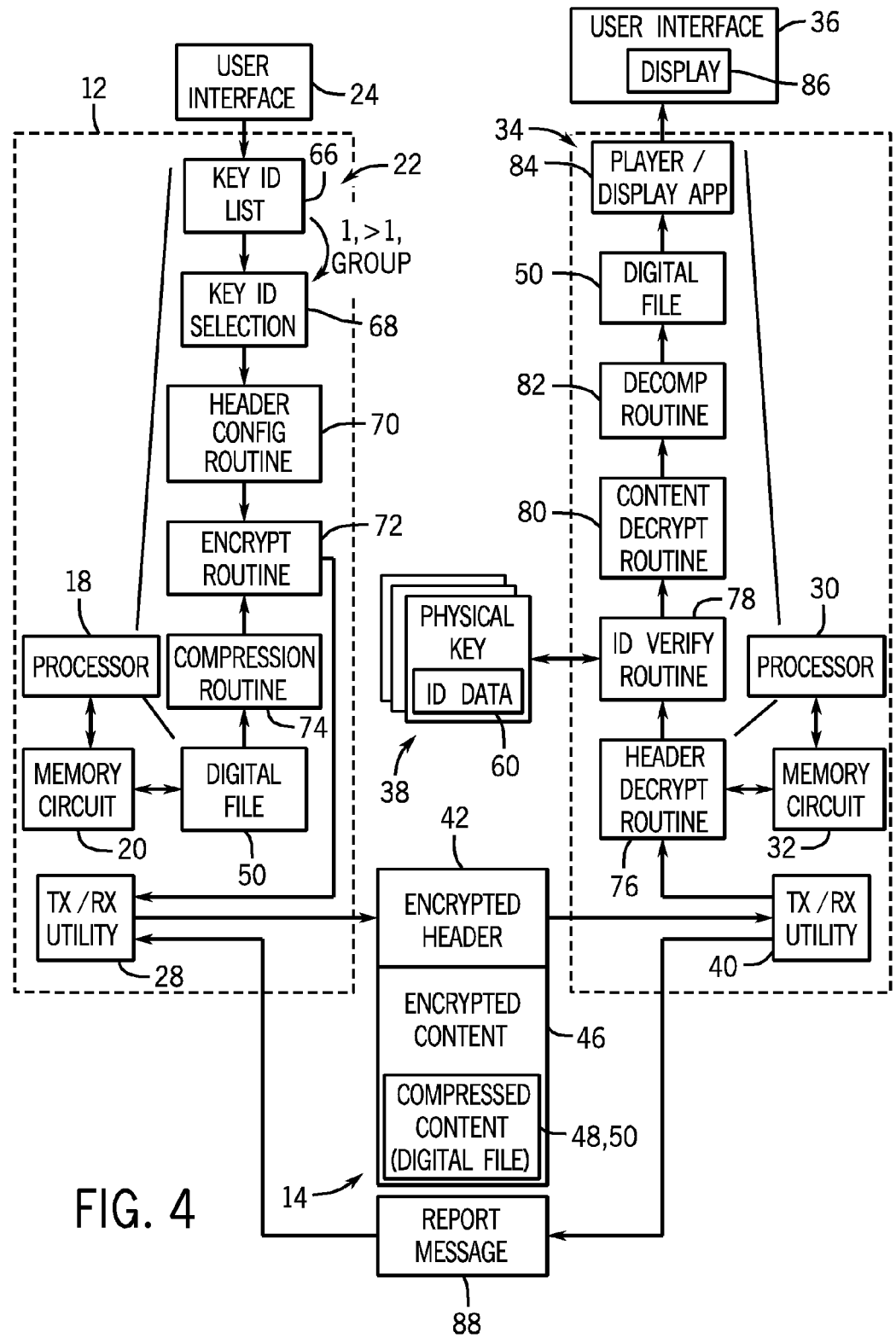
FIG. 4 is a diagrammatical representation of certain of the key functional components of the sending and receiving computers of FIG. 1, adapted for transmission of a secure file of the type illustrated in FIG. 2.

Turning now to the drawings, and referring first to FIG. 1, a system 10 is illustrated for transferring a digital file or digital data in a secure manner. In the illustrated embodiment, the system includes a sending computer 12 that is adapted to send an encrypted file 14 to a receiving computer 16. As will be appreciated by those skilled in the art, the file will typically be sent over the Internet, and transmission networks may include servers, local area networks, wide area networks, virtual private networks, and so forth, not specifically illustrated in FIG. 1. Indeed, throughout the present discussion, reference will be made to the sending computer and the receiving computer, although, in practical applications, there may be multiple sending computers, and multiple receiving computers, as well as various components associated with these for the delivery of data transmissions, such as servers, routers, gateways, and software associated with these devices that facilitate data transmission.

In the illustrated embodiment, sending computer 12 includes a processor 18 and memory 20 adapted to work together to process digital content and to send it to the receiving computer as described below. The processor 18 may include any suitable hardware, firmware and software, and may be embodied in an application-specific computer or in a general-purpose computer. In addition to other support circuits, such as power supplies, disc drives, and so forth, the computer memory 20 may be of any sort, including, for example, random access memory, programmable read-only memory, electronically programmable read-only memory, disc drives, optical storage devices, dynamic memory, and so forth. In addition to other software stored in the memory that can be executed by the processor 18, memory 20 stores file processing software 22 which is used to encrypt, compress and otherwise manipulate digital content that is to be sent in the encrypted file 14, as described more fully below. In general, the software 22 is executed by the processor 18 during operation and serves to create or condition the file for transmission in accordance with the invention.

The sending computer 12 is designed to interoperate with a user interface 24. The user interface may include various components generally known in the art, such as a keyboard, a mouse, a monitor, a printer, and so forth. As described below, the user interface allows for a human user to designate one or more intended recipients for the digital content contained in the encrypted file 14. The user interface also allows the user to select digital content for transmission to the intended recipients, and to coordinate its formulation into the encrypted file 14 and the transmission of the encrypted file to the recipients. The sending computer 12 is also adapted to interact with a file repository 26. In certain simple implementations, the file repository 26 may be part of memory 20. However, the repository may be separate or even remote from the sending computer 12. The file repository stores digital content in the form of text files, video files, audio files, multi-media files, and so forth that may be selected by a user via the user interface 24 for creation of the encrypted file 14 that is to be transmitted to the one or more intended recipients.

Receiving computer 16 is equipped similarly to the sending computer. That is, the receiving 16 includes a processor 13 and memory 32 that includes software designed to facilitate processing of the encrypted file once received by the receiving computer. In general, the file processing software 34 is executed by the processor 30 as described below, and enables the system to determine whether the encrypted file can be opened and decrypted, as well as providing for decompression of any contents of the file, viewing or interacting with the contents of the file, and so forth. The receiving computer is also associated with a user interface 36, which will typically include a keyboard, a computer mouse, a monitor, and any other components that facilitate accessing and interacting with the digital contents of the encrypted file. As with the sending computer 12, the receiving computer 16 may be an application-specific computer or a general purpose computer.

The receiving computer is associated, moreover, with a physical key 38. The physical key 38 is a device that can be removed from the computer, such as by insertion and removal from a USB port, a serial port or any other port provided on the receiving computer. As described more fully below, the physical key includes data which must correspond to data in the encrypted file 14 to permit the receiving computer to decrypt and access the digital contents of the file. It should be noted that because the physical key 38 is removable from the receiving computer, it may be associated with other receiving computers as well, and only selectively coupled to any particular receiving computer when the user desires to access the encrypted file. Thus, to the extent that file processing software is present on any suitable computer, the physical key 38 can be associated with that computer and the encrypted file accessed and manipulated to view or otherwise interact with the digital contents as described below. The physical key is, thus, independent of the receiving computer, and not only may the physical key interact with other receiving computers, but other physical keys that have authorization for access to the contents of the encrypted file may be associated with the same receiving computer. The physical key will typically be authorized to be in the possession of one or more specific persons for whom access to the digital contents of the encrypted file is intended. While in most cases the physical key and the data contained in the physical key will be sufficient for secure access control, other interface devices, software and so forth of the receiving computer may also be required for access to the contents of the encrypted file, such as biometric devices, key codes, user names and passwords, and so forth.

In the embodiment illustrated in FIG. 1, the sending computer and the receiving computer are configured with transmission and reception utilities 28 and 40, respectively. These utilities may include electronic messaging programs, automatic and manual messaging and file sharing programs, and so forth. The utilities enable the encrypted file to be transmitted from the sending computer to the receiving computer, as well as allowing for messages to be transmitted between the two computers as described below. It should also be noted, however, that while a scenario is envisioned in which the sending computer prepares and sends the encrypted file in a message to the receiving computer, other scenarios may also be envisaged. For example, the sending computer may, where desired, place the encrypted file in a shared repository to which the receiving computer can gain access. Thus, when the encrypted file is ready for access or manipulation by the receiving computer, the sending computer may notify a person, or the receiving computer of such availability, and the receiving computer may retrieve the file as desired. In all such scenarios, however, some sort of utility will typically be provided for uploading the encrypted file into such a shared repository and for downloading the file into the receiving computer for secure access.

FIG. 2 illustrates a presently contemplated configuration for the encrypted file transmitted to the receiving computer. In the embodiment illustrated in FIG. 2, the file 14 includes a header 42 which, in the illustrated embodiment, is itself encrypted. The encrypted header includes physical key identification data 44 which is used to ensure that the physical key described above is present and corresponds to a permitted recipient as described more fully below. The physical key identification data may be, for example, a character string which can be compared to physical key data from the physical key itself during a verification process. As noted above, in certain cases, the header may not be encrypted. The encrypted file 14 also includes an encrypted content portion 46 which consists of encrypted content. Essentially, the encrypted content will include the digital data to which access is to be restricted. In the presently contemplated embodiment illustrated in FIG. 2, the encrypted content includes compressed content 48 which, itself, embodies the final digital file 50. As noted above, the digital file itself may be code that can be interpreted by an application program to provide a representation of a text document, a video document, an audio document, a multi-media presentation or show, and so forth. As will be appreciated by those skilled in the art, during compilation of the encrypted file 14, the digital file 50 is first selected, and is compressed to create the compressed content 48. The compression may be performed by any suitable compression utility, such as JPEG, MPEG, or various specialized encoding processes, such as Huffman encoding, run length encoding, various available lossless or lossy encoding algorithms, and so forth. Similarly, encryption of the compressed content may be performed by any suitable available encryption utility. In certain circumstances, the digital file may be encrypted without being first compressed.

It should be noted that in a presently contemplated embodiment, the digital data file is sent in a "read only" or "play only" format, and cannot be altered by the receiving computer. This is particularly attractive in certain types of application, such as for post-production stages of television, video and film projects. In such applications, the receiving computer may create new files that are later synchronized or otherwise associated with the received file, with no real need to alter the original digital content. Similarly, the digital data may be streamed to the receiving computer, such that a full copy of the digital data file does not reside on the receiving computer. In other applications, however, it may be useful to permit such alteration or modification.

FIG. 3 illustrates certain functional components of a physical key 38. The physical key will typically include a physical interface 52 which is designed to plug into or otherwise couple to the receiving computer for data exchange between the receiving computer and the key. For example, the physical interface 52 may be configured in accordance with a USB format. The physical interface 52 extends from a body 54 in which functional components are housed. In the illustrated embodiment the functional components includes a processor 56 which would typically be a microprocessor designed to receive instructions from the receiving computer and to return data including data stored in a memory circuit 54. Among other codes stored in the memory circuit will be identification data 60. The identification data 60 is unique to the physical key, and may be returned by the processor to the receiving computer when prompted to do so. A transmit and receive utility 62 associated with the processor enables the processor to communicate with the receiving computer. In the illustrated embodiment, driver software 64 will typically be provided within the receiving computer to facilitate data exchange between the physical key and the receiving computer. The driver software will typically be provided by the manufacturer of the physical key, and designed specifically for data exchange with the type of physical key used. For example, the physical key may be of a type commercially available from SafeNet, Inc. of Belcamp, Md. under the commercial designation "iLok".

It should be noted that the physical key described above is equipped with a processor that enables it to interact with driver software (or more generally, with specialized interface software) stored on the receiving computer. It is presently contemplated that such devices will ensure that the connection is secure by virtue of such interacting. Indeed, the physical key should not be susceptible of reading by users directly, but only by licensed or otherwise secure applications. Thus, the identification data stored on the physical key cannot be simple reproduced, pirated, manually input or the like. It should also be noted that although a physical key is utilized, other, additional security features may also be employed, such as passwords, challenge/response schemes, and so forth.

FIG. 4 illustrates exemplary functional components contained within the sending computer 12 and the receiving computer 14 for transmission and use of the digital file in the form of the encrypted file 14. As noted above, the sending computer will have a user interface 24 that allows a human user to select the digital file to be packaged and sent to the receiving computer 14. The receiving computer 14, in turn, includes a user interface 36 that allows human user to interact with the file once received, so long as the physical key 38 matches data in the header of the encrypted file as described below.

In the embodiment illustrated in FIG. 4, the sending computer includes or has access to a key identification list 66 which allows the user to select one or more intended recipients for the encrypted file. In a presently contemplated embodiment, the key identification list may be available in a drop-down menu or other interface facility and may list recipients by code, name, organization, and so forth. The user may then select one or more intended recipients from the list to create a key identification selection 68. The key identification selection, again, may include one or more individual recipients, or a group of recipients, such as a post-production company, department, group, and so forth. The key identification selection 68 is then used to configure the header 42. In particular, the header 42 will be formatted by a header configuration routine 70 to include the one or more key identification codes selected by the user. In the case of a header that is to be encrypted, the header configuration routine 70 will then advance the configured header to an encryption routine 72 which will encrypt the header.

It should be noted that the selection of one or more recipients may, in practice, involve reference to a database structure that will include a listing of potential recipients, any groups or organizations with which they are associated, and the identification data associated with them. However, such data will preferably be secure from view to the user. That is, the identification data for intended recipients will, in most cases, be kept secret such that the data may not be pilfered or reproduced, thereby ensuring that unwanted access to the digital content, such as by emulation of the physical key, is thwarted.

It should also be noted that, in addition to the technique of use of the secure identification data outlined in the present discussion, the sending computer may also encode the encrypted file to time out (i.e., disallow access after a specific time or date), or to limit the number of times the file may be accessed. Any number of such schemes are generally known in the art and may be employed with the invention.

At the same time, the user, via the user interface 24, can select the digital file 50 from memory circuit 20 or from a file repository as indicated with reference to FIG. 1 in the case of file repository 26. With a digital file selected, the sending computer can execute a compression routine 74 designed to compress the digital contents of the file, where desired. The digital file, then, either compressed or uncompressed, will be routed to the encryption routine 72 which will encrypt the digital file and associate the digital file with the header. It should be noted that the various routines summarized in FIG.

4 within the sending computer will typically be stored within the memory circuitry and will be executed by processor 18.

Once the digital file has been associated with a header that includes the key identification data, the transmit and receive utility 28 can forward the file to the receiving computer (or make the file available via a shared repository as noted above). As described above, the file will include the header with the physical key identification data, as well as the encrypted content which may be compressed.

The receiving computer includes software routines that enable it to determine whether the receiving computer has authorization to access the encrypted digital file contents by means of the physical key. In particular, as illustrated in FIG. 4, the encrypted file is received in the receiving computer by the transmit and receive utility 40, and is advanced to a header decryption routine 76. Where the header is encrypted in the encrypted file 14, the decryption routine 76 is designed to allow decryption only of the header, and not the encrypted content. Various routines may be envisaged for such decryption, and will typically be designed to mirror the encryption performed by the encryption routine 72 of the sending computer. However, the decryption of the encrypted content including the digital file data itself cannot be performed by the header decryption routine 76. With the header data alone decrypted, an identification verification routine 78, which will typically be associated with driver software as summarized above with regard to FIG. 3, interacts with the physical key 38 which is physically coupled, but removable from the receiving computer. The verification routine, and the driver associated with it, then extracts the identification data from the physical key and compares the identification data to that contained in the encrypted file header. If the identification data of the physical key matches or corresponds to one of the key identification codes provided in the header, then, the receiving computer is authorized to proceed to decryption of the digital file contents within the encrypted content section 46 of the file. This is performed by a content decryption routine 80 which may be similar to routine 76, but which is designed to allow for decryption of the encrypted content itself. Where the content is further compressed within the encrypted file, a decompression routine 82 serves to decompress the digital file, and will typically perform an inverse operation to that performed by compression routine 74 of the sending computer. As a result, the receiving computer will obtain the digital file 50 reconstructed for access by the user. Depending on the type of digital file, a player or display application 84 allows the user of the receiving computer to open, view, modify, listen to or otherwise use and interact with the digital file. For example, for text files, the application may include a text editor, while for multi-media files the application will typically include a multi-media player or editor. The user interface 36 will typically include a display, with speakers and any other interactive tools that allow the digital file to be used by the recipient computer user. As noted above, the recipient computer user will typically be one specific person or specific persons who have physical possession of the physical key 38. As also noted above, multiple physical keys may permit access to the digital file, where such physical keys include identification data corresponding to the key identification selections made by the sending computer user and encoded within the encrypted file header. Finally, as also noted above, the receiving computer may be prompted to input additional security data, such as user names and passwords, biometric data, and so forth that compliment the security features of the physical key. All of the routines discussed above will typically be stored within the memory circuitry 32 of the receiving computer and executed by the processor 30.

In practice, while the same encryption (and decryption) routine may be used to encrypt and decrypt the header portion of the file, it is presently contemplated that the keys used to decrypt the header and content portions will differ, enabling the header to be encrypted and decrypted separately from the digital content portion of the file. For example, the header decryption key may be fixed and embedded in the routine on the receiving computer that initially accesses the file. The header may thus be readily decrypted, but only on those computers that are configured with the access (interface) software. On the other hand, the key required for decrypting the content portion of the file is not part of the same routine. For example, in a presently contemplated embodiment, the same routine (or a separate program) may formulate the decryption key for the digital content portion at least partially based on the physical key identification data. The original encryption steps, then, performed on the sending computer, may have performed a reverse operation, by which the decryption key is formulated, and the key is then reformulated by the receiving computer once, and only if the physical key identification data matches the identification data for an intended recipient stored in the file header. The use of different key sequences, then, allows for separate and secure decryption of the header (if encrypted) and the digital content. Moreover, it is also contemplated that the encryption used for the header and for the content portion may be different, with the header using less demanding encryption (e.g., 64 bit) than that used for the digital content (e.g., 128 or 256 bit).

In the embodiment illustrated in FIG. 4, messages may also be exchanged between the sending computer and receiving computer. As described above, one message may include a transmission of the encrypted file 14. Report messages 88 may also be returned by the receiving computer to the sending computer to indicate the success or failure of the receipt and use of the encrypted file.

Figure 5:
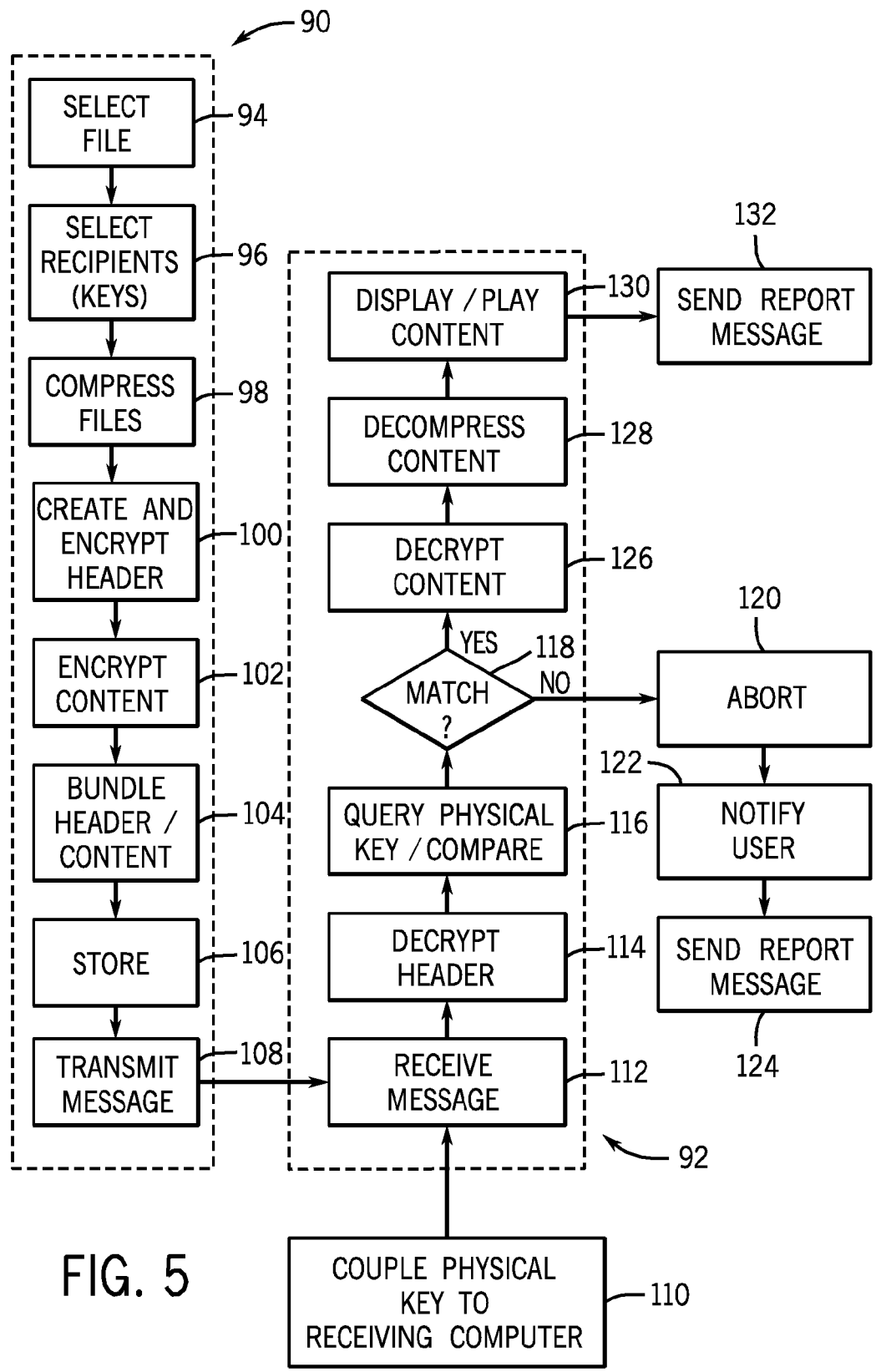
FIG. 5 is a flow chart illustrating exemplary logic for creation, transmission and access to the secure digital data file in accordance with the systems and file configuration of the previous figures.

FIG. 5 is a flow chart illustrating exemplary logic for carrying out the processes described above within the sending and receiving computers. The logic will typically include sending computer logic designated generally by reference numeral 90, and receiving computer logic designated by reference numeral 92. The sending computer logic will begin with selection of the digital file to be sent to the receiving computer as indicated at step 94. Again, this may be performed by a graphical user interface with conventional file selection facilities, drop-down menus, and so forth. At step 96, the user of the sending computer selects one or more recipients that will each be associated with physical key identification data to be included in the encrypted file header. As noted above, the key for decrypting the header may be part of the interface software used by the receiving computer (e.g., fixed and embedded in the software), thereby permitting ready decrypting of the header so long as the receiving computer is configured with the software. At step 98, if the digital file is to be compressed, this is performed by a compression algorithm. At step 100, then, the header is created and may be encrypted as discussed above. Again, the header includes data identifying the physical keys of recipients to which the access to the digital content is to be limited. At step 102 the content of the digital file is encrypted, and at step 104 the encrypted content is bundled with the header to create the encrypted file that is sent to which access is permitted by the receiving computer. As noted above, this process may include formulation of a decryption key for the digital content portion of the file from the identification data of the intended recipients. At step 106, optionally, the encrypted file may be stored, such as in the receiving computer, or in a repository. It should be noted that such storage may also take place after the compression step, the encryption step, or at multiple steps. Finally, at step 108, the digital file is transmitted to the receiving computer, or may be placed in a repository that can be accessed by the receiving computer. In either event, a message may be sent from the sending computer to the receiving computer to indicate that the encrypted file is ready for access by the receiving computer in association with the removable physical key.

Prior to executing the logic 92 within the receiving computer, the removable physical key is coupled to the receiving computer as indicated at step 110. Again, this operation may be as simple as plugging the physical key into a port of the receiving computer. At step 112, then, the receiving computer receives the message from the sending computer and accesses the encrypted file. At step 114, if the header of the encrypted file is encrypted, this header is decrypted. Again, the decryption at this step is limited to the header only (e.g., by reference to a key encoded in the interface software), and the decryption routine is not permitted to decrypt the digital file contents within the encrypted content portion of the file. At step 116, then, the receiving computer queries the physical key for the key identification data and performs the comparison with the identification data encoded in the header.

As indicated at step 118, if there is a match between the identification data, the process may continue for accessing the file contents. However, if no match is found, the process is aborted as indicated at step 120. In a presently contemplated embodiment, such termination of the process may result from a lack of a match between the physical key identification data, from other criteria, such as user name and password mismatches, and so forth. In any event, the user of the receiving computer is notified that access to the digital file is denied as indicated at step 122. Also, in a presently contemplated embodiment, the receiving computer will send a reporting message back to the sending computer indicating that the receiving computer was not able to access the digital file, as indicated at step 124. Where a user of the receiving computer attempts to access the digital file without authorization or without the proper physical key, then, the receiving computer may notify the sending computer of such failed attempt so that steps can be taken to investigate who and how the digital file was attempted to be accessed.

At step 118, if a match is found between the data of the physical key and the identification data of the encrypted file header, processing may advance to step 126 where the content is decrypted. As noted above, the decryption key for the digital content portion may be formulated by an algorithm based upon the physical key identification data (e.g., performing mathematical operations based upon the identification data sequence, extracting all or a part of the sequence, etc.). If the content has been compressed, then, it may be decompressed as indicated at step 128, and ultimately the digital content is displayed or otherwise played as indicated at step 130. The user of the receiving computer may then perform various acts, manipulate and augment the data in a digital file, and otherwise work with the digital file in a conventional manner. However, as noted above, in presently contemplated embodiments, the digital content file is sent in a "read only" or "play only" format. In a presently contemplated embodiment, a report message is sent form the receiving computer to the sending computer as indicated at step 132 to indicate that access to the digital content was successful. Such messages may also indicate additional data, such as the time of the access, the physical key or the person associated with the physical key who performed the successful access, and so forth.

It should be noted that in the foregoing discussion, reference is made to the sending and receiving computers. In practice, where desired these roles may reverse. That is, the receiving computer may be configured with software and functionality similar to the sending computer. In such cases, the receiving computer may alter the digital file, or create other files that may be sent back to the sending computer, or to other computers that are configured as receiving computers. Although, as noted above, in a presently contemplated embodiment, the file is sent to the receiving computer in a "read only" or "play only" format, as also noted above, in other contexts the file may be alterable, such that the receiving computer may then store and retransmit the digital content, in a manner similar to that used by the sending computer. In such cases, the original sending computer may require a physical key to reaccess the same or a different digital content file in the same manner as the original receiving computer did.

Technical effects of the invention include the ability to more securely compile and transmit digital files between a sending computer and a receiving computer. In particular, the technical effects extend to a wide range of digital files, including text files, audio files, video files, multi-media files, and so forth. By virtue of the techniques described above, user access to such files is limited by virtue of the identification data stored within the encrypted file header. Access to the digital file contents itself, then, is permitted only if the header identification data matches the identification data in the removable physical key. Substantial improvement in the secure transmission and access to digital files is therefore contemplated, along with reduction in the risk of pirating and other types of pilfering of digital files and their content.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for controlling access to a digital file, comprising:
   on a reading computer, accessing an encrypted file, the file including a header and encrypted digital content, the header including data identifying a permitted access identity corresponding to a physical key removable from the reading computer;
   receiving a physical key that is removably coupled to the reading computer, the physical key comprising identity data identifying the physical key, wherein the identity data is undetectable by a user at the reading computer;
   comparing the permitted access identity in the header to the identity data of the physical key removably coupled to the reading computer; and
   decrypting the encrypted digital content only when the identity data of the physical key matches the permitted access identity in the header.

2. The method of claim 1, wherein the identity data is not detectable by a user at the reading computer.

3. The method of claim 1, wherein the header is encrypted and wherein the method includes decrypting the header prior to comparing the permitted access identities to the identity data of the physical key.

4. The method of claim 3, wherein the header is decrypted via first key data, and the digital content is decrypted via second key data.

5. The method of claim 4, wherein the second key data is generated at least partially from the physical key identity data.

6. The method of claim 1, wherein the digital content is compressed and wherein the method includes decompressing the digital content after decryption.

7. The method of claim 1, comprising playing, displaying or modifying the digital content on the reading computer.

8. The method of claim 7, wherein the digital content is played, displayed or modified by an application that performs the steps of recited steps when a user attempts to access the digital content via the application.

9. The method of claim 1, wherein the identity data of the physical key is accessed by a routine stored on the reading computer.

10. The method of claim 1, wherein the header includes a plurality of permitted access identities, and wherein the digital content may be decrypted by the reading computer if the comparison determines that the identity data of the physical key matches any one of the permitted access identities.

11. A system for controlling access to a digital file, comprising:
   a tangible, non-transitory, computer-readable medium;
   an encrypted file, stored on the tangible, non-transitory computer-readable medium, comprising a header and encrypted digital content, the header including data identifying a permitted access identity corresponding to an identity of a physical key removable from a reading computer, the physical key comprising identity data identifying the identity of the physical key, wherein the identity data is undetectable by a user at the reading computer;
   a physical key interface configured to decrypt the encrypted header, to compare the permitted access identity to the identity data of the physical key removably coupled to a reading computer, and to decrypt the encrypted content only if the identity data of the physical key matches the permitted access identity of the header.

12. The system of claim 11, wherein the header is encrypted.

13. The system of claim 11, wherein the digital content is compressed, and wherein the key interface includes a decompression routine permitting decompression of the digital content.

14. The system of claim 11, wherein the encrypted file and the key interface are stored on a reading computer.

15. The system of claim 11, further comprising a physical key removably coupled to the reading computer, the physical key containing identity data and being configured to be queried by execution of code stored on the reading computer for comparison of the identity data to the permitted access identity.

16. The system of claim 11, comprising a player application on the reading computer for playing or displaying the content.

17. The system of claim 16, wherein the player application calls the key interface upon receipt of an instruction from a user to access the content.

18. A method for controlling access to a digital file, comprising:
   on a reading computer, accessing an encrypted file, the file including a header and encrypted digital content, the header including data identifying a plurality of permitted access identities corresponding to a physical key removable from the reading computer;
   receiving a physical key that is removably coupled to the receiving computer, the physical key comprising identity data identifying the physical key;
   when a physical key is removably coupled to the receiving computer:
   accessing identity data stored on the physical key, the identity data providing an identity of the physical key, wherein the identity data is undetectable by a user at the reading computer;
   comparing the plurality of permitted access identities in the header to the identity data stored on the physical key; and
   decrypting the encrypted digital content only when the identity data of the physical key matches at least one of the plurality of permitted access identities in the header.

* * * * *